United States Patent Office 3,163,612
Patented Dec. 29, 1964

3,163,612
METHOD FOR THE PRODUCTION OF A HYDROCARBON CONVERSION CATALYST
Erwin E. Meisinger, Elmhurst, and Ernest L. Pollitzer, Hinsdale, Ill., assignors to Universal Oil Products Company, Des Plaines, Ill., a corporation of Delaware
No Drawing. Filed July 15, 1960, Ser. No. 42,987
5 Claims. (Cl. 252—438)

This invention relates to a hydrocarbon conversion and also to a method for the production of catalysts therefor. More particularly the invention is concerned with a process for preparing catalysts which are useful for polymerizing unsaturated hydrocarbons.

The need for crude rubber, either natural or synthetic has increased at a tremendous rate inasmuch as rubber has attained a position of great importance as a material of modern manufacture, said importance being due to the diverse uses to which it may be put. Heretofore in past years the amount of rubber which may be obtained naturally from rubber trees has been sufficient to satisfy the requirements of modern living. However, the sources of natural rubber may be made unattainable to many countries due to emergencies which may arise. This condition was made apparent during the last war when many sources of natural rubber in the Far East, such as Southeast Asia, were cut off from the Western Hemisphere. When situations such as this arise, substitutes must be found to take the place of the missing natural rubber. Heretofore, synthetic rubbers such as the types produced by the reaction of butadiene and styrene (GR-S), butadiene and acrylonitrile (Buna-N), butadiene and isobutylene, Thiokol rubber, silicone rubber, Neoprene rubber, etc., have been prepared. However, these products have usually been inferior to natural rubber in many of the necessary properties when in the vulcanized, elastic state.

It has now been discovered that a diolefinic hydrocarbon such as isoprene may be caused to polymerize stereoselectively to a rubbery product similar in many respects to the natural Hevea type rubber. The uses of such a rubber in articles of manufacture are many and varied, being too numerous to list in their entirety. A few representative uses are, for example, raw rubber which may be used in the shoe industry for the production of crepe soles for shoes, for erasers, adhesive cements and in the fabrication of gummed fabrics such as, for example, rubber cloaks; vulcanized rubber products which will include bumpers, buffers, vehicle tires, shock- and soundproof articles, rubber bands, stoppers, stamps, sponges, elastic thread, belts, packing materials for machine construction, installation, etc.; and hard rubber which may be used as a suitable material for combs, tubing, fountain pens, dental goods, etc.

Therefore, as hereinbefore set forth, the need for a diolefinic hydrocarbon such as isoprene is greatly magnified, said compound assuming a greater importance than heretofore known for the production of such a rubber as the hereinabove mentioned Hevea type.

It has now been discovered that unsaturated organic compounds such as olefinic hydrocarbons and, particularly, propylene may be selectively converted in the presence of a novel catalyst hereinafter set forth to form a dimer of propylene, namely, 2-methyl-2-pentene, which is an intermediate in the preparation of isoprene, the final product being obtained by the demethanation of the propylene dimer.

In addition to the preparation of dimers which are used in the preparation of isoprene the polymers prepared according to the process of this invention may also be used for motor fuels such as gasoline and as intermediates in the preparation of surface active agents or solvents such as alcohols, amines, etc.

It is therefore an object of this invention to provide a catalyst which is useful for the conversion of organic compounds to prepare desired products.

Another object of this invention is to provide a catalyst which will selectively convert unsaturated hydrocarbons to preferred polymers thereof.

A specific object of this invention is to provide a method for preparing catalysts which will selectively polymerize certain olefinic hydrocarbons to provide a desired polymeric product.

One embodiment of this invention resides in a process for the conversion of an unsaturated organic compound which comprises treating said compound at conversion conditions in the presence of a conversion catalyst which has been prepared by treating a metal oxide support with an alkali metal salt, calcining the resultant promoted metal oxide support and thereafter impregnating said support with an aminated alkinous metal to prepare the desired catalyst.

Another embodiment of this invention resides in a method for the production of a hydrocarbon conversion catalyst which comprises treating a metal oxide support with an alkali metal salt, calcining the resultant promoted metal oxide support and thereafter impregnating said support with an aminated alkali metal to prepare the desired catalyst.

A further embodiment of this invention resides in a method for the production of a hydrocarbon conversion catalyst which comprises treating a metal oxide support with lithium nitrate, calcining the resultant promoted metal oxide support at a temperature in the range of from about 500° to about 750° C. and thereafter impregnating said support with an aminated alkali metal to prepare the desired catalyst.

Yet another embodiment of the invention resides in a process for the conversion of an olefinic hydrocarbon which comprises treating said hydrocarbon at conversion conditions in the presence of a hydrocarbon conversion catalyst which has been prepared by treating a metal oxide support with lithium nitrate, calcining the resultant promoted metal oxide support at a temperature in the range of from about 500° to about 750° C. and thereafter impregnating said support with an aminated alkinous metal to prepare the desired catalyst.

Another further embodiment of this invention is found in a method for the production of a hydrocarbon conversion catalyst which comprises treating a metal oxide support with an alkali metal salt, calcining the resultant promoted metal oxide support at a temperature in the range of from about 500° to about 750° C. and thereafter impregnating said support with potassium amide to prepare the desired catalyst.

A specific embodiment of the invention resides in a process for the production of a hydrocarbon conversion catalyst which comprises treating gamma-alumina with lithium nitrate, calcining the resultant promoted alumina at a temperature in the range of from about 500° to about 750° C. and thereafter impregnating said support with potassium amide to prepare the desired catalyst.

Another specific embodiment of the invention is found in a process for the dimerization of propylene which comprises treating said propylene at a temperature in the range of from about 50° to about 300° C. and at a pressure in the range of from about 5 to about 250 atmospheres in the presence of a catalyst which has been prepared by treating gamma-alumina with lithium nitrate, calcining the resultant promoted alumina at a temperature in the range of from about 500° to about 750° C. and thereafter impregnating said support with potassium amide to prepare the desired catalyst.

Other objects and embodiments referring to alternative aminated alkali metals and promoted metal oxide supports will be found in the following further detailed description of the invention.

Unsaturated organic compounds and particularly olefinic hydrocarbons which may be condensed (the terms "condensed" and "condensation" as used herein in the specification and appended claims will be defined as, but not limited to, "polymerized" and "polymerization," and may also include alkylation) by heating in the presence of a novel catalyst of the type hereinafter more fully described include monoolefins such as ethylene, propylene, 1-butene, 2-butene, 1-pentene, 2-pentene, 1-hexene, 2-hexene, 3-hexene, 1-heptene, 2-heptene, etc., polyolefins such as 1,3-butadiene, 2-methyl-1,3-butadiene, 1,3-pentadiene, 1,4-pentadiene, 1,3-hexadiene, 1,4-hexadiene, etc.; cyclic olefins such as cyclopentene, cyclohexene, cycloheptene, etc. In addition it is also contemplated within the scope of this invention that besides the aforementioned olefins which may be condensed by themselves, other olefins of the types hereinbefore listed may be condensed with a dissimilar olefin although not necessarily with equivalent results. In addition to the condensation of the aforementioned olefins the catalyst composition hereinafter described may be used as a catalyst for the side chain alkylation of alkaryl compounds, and particularly alkyl aromatic hydrocarbons which contain at least one replaceable hydrogen atom on the α-carbon atom in the side chain, such compounds including toluene, o-xylene, m-xylene, p-xylene, ethylbenzene, propylbenzene, isopropylbenzene, butylbenzene, the diethylbenzenes, the dipropylbenzenes, etc., the aforementioned olefinc hydrocarbons, or compounds capable of forming olefinic hydrocarbons under the conditions at which the reaction proceeds being used as the alkylation agents. Furthermore, the catalyst composition will act as an isomerization catalyst, shifting the double band of unsaturated hydrocarbons, such as butene-1, or propylene dimer (2-methyl-1-pentene), usually to a more centralized position in the chain without further polymerization of the olefin, said isomerization involving only the shift of the double bond without carbon skeleton rearrangement.

As hereinbefore set forth the invention is concerned with the preparation of a hydrocarbon conversion catalyst and particularly a catalyst which is active in the polymerization of unsaturated compounds hereinabove set forth. The catalyst comprises an aminated alkali metal disposed on a promoted metal oxide support. The term "promoted" as used hereinbefore and hereinafter in the specification and appended claims will refer to a pretreatment of the metal oxide support with a salt of both the alkali metals and alkaline earth metals such as lithium, sodium, potassium, rubidium, cesium, calcium, strontium, and barium. However, not every solid support can be utilized as a satisfactory one for disposal of an alkali metal thereon. As is well known to one experienced in the art, the alkali metals react relatively violently with water and thus care must be taken to utilize those supports which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metals in the preparation of catalysts for use in the process of this invention. Alpha-alumina is usually characterized by a surface area ranging from about 10 to about 25 square meters per gram. In contrast, gamma-aluminum which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal dispersions on sand or on other low surface area silica are not satisfactory catalysts in this process. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion the limitation on the use of any particular support is one of freedom from combined or adsorbed water in combination with the surface area of the support selected. In addition to the aforementioned types of support another type is that which is prepared from an alkali aluminate such as sodium aluminate, potassium aluminate, etc., from which a substantial majority of the alkali metal has been removed leaving only the aluminate with a relatively minor amount of the alkali metal present.

The desired support, preferably, although not necessarily, gamma-, etc- or theta-alumina may be pretreated with a promoter in any manner. The preferred method for promoting the support is to contact or impregnate the support with the salt of an alkali metal. Particularly effective salts which may be utilized comprise the nitrates of the alkali metal such as sodium nitrate, potassium nitrate, lithium nitrate, cesium nitrate, barium nitrate, calcium nitrate, magnesium nitrate, strontium nitrate, etc. Other salts of alkali metals or alkaline earth metals which will decompose at temperatures below about 750° C. may also be utilized, although not necessarily with equivalent results. If this method of impregnating the solid support is utilized the promoted support is then calcined at a temperature in the range of from about 500° to about 750° C. whereby the nitrate salt of the alkali metal or alkaline earth metal is probably decomposed to the oxide.

Following the treatment of the solid support with an alkali metal salt or alkaline earth metal salt the promoted solid support may then be further impregnated with an alkali metal such as potassium, lithium, sodium, cesium, rubidium, etc. A preferred method of preparing the catalyst of this invention is to dissolve the desired alkali metal in ammonia and impregnating the promoted solid support such as the gamma-alumina with an ammonia solution of the alkali metal amide, the alkali metal amide having been formed when the alkali metal reacted with the ammonia. Following this impregnation by the alkali metal amide in ammonia the excess ammonia is driven off and the catalyst is then ready for use in the desired conversion reaction.

An alternative method of preparing the catalyst is to further impregnate the promoted metal support with the same or a different alkali metal in a manner similar to that hereinabove set forth, that is, by impregnation of the promoted support with the alkali metal. Following the impregnation of the promoted solid support with the additional alkali metal the support may then be aminated by treatment with anhydrous ammonia at temperatures ranging from about 25° to about 200° C., the temperatures used being dependent upon the alkali metal and being preferably maintained below the melting point of the alkali metal. It has been discovered and will hereinafter be shown that the aforementioned pretreatment of the alumina with the alkali metal salt before impregnation with an alkali metal will result in the formation of a hydrocarbon conversion catalyst which possesses increased efficiency and ability to convert the hydrocarbon to desired products over those catalysts in which the solid support has not been subjected to pretreatment before impregnation with the alkali metal.

The hydrocarbon conversion processes utilizing the catalyst compositions of the present invention may be effected in any suitable manner and may comprise either a batch or a continuous type operation. One example of a batch type operation which may be used is the conversion of an olefinic hydrocarbon to a polymer thereof. A quantity of the unsaturated organic compound such as an olefinic hydrocarbon, a particular example of which is propylene, is placed in an appropriate apparatus such as a condensation flask or, if higher temperatures and pressures are to be used, in a rotating autoclave. The particular apparatus which has been selected will contain the conversion catalyst of the type hereinbefore set forth comprising an aminated alkali metal disposed on a promoted metal oxide support. If so desired a substantially inert organic diluent may also be used, said diluent including aromatic hydrocarbons having no alkyl substituents which possess an α-hydrogen, examples of such hydrocarbons including benzene, naphthalene, pyrene, etc., or paraffinic hydrocarbons such as n-pentane, n-hexane, n-heptane, cyclopentane, cyclohexane, cycloheptane, etc. The apparatus and contents thereof are then heated to the desired reaction temperature and maintained thereat for a predetermined period of time. If higher than self-generated pressures are to be used an inert gas such as nitrogen may be pressed in until the desired pressure has been reached. At the end of this time the desired reaction product is separated from the catalyst and recovered by conventional means such as fractional distillation, crystallization, etc.

The process of this invention may also be effected in a continuous type operation, the catalyst comprising an aminated alkali metal disposed on a promoted metal oxide support being particularly suitable for use in a fixed bed type of operation. When this method is used the catalyst is disposed as a fixed bed in a reaction zone maintained at the proper operating conditions while the olefinic hydrocarbon and solvent, if one is desired, are continuously charged thereto through separate lines. The reaction zone may comprise an unpacked vessel or coil or may be lined with an adsorbent packing material such as dehydrated bauxite, alumina, fire brick or the like. Alternatively, the olefinic hydrocarbon and the organic solvent or diluent may be admixed prior to entry into said reactor and charged thereto in a single stream. In carrying out the process of this invention in a continuous manner, liquid hourly space velocities (the volume of liquid hydrocarbon charged to the reactor per volume of catalyst per hour) may be varied within a relatively wide range of from about 0.1 to about 20 or more, the preferred range being from about 0.1 to about 10. The desired reaction product is continuously withdrawn from the reaction zone, separated from the reactor effluent and purified by conventional means while said remaining effluent may be recharged at least in part to the reaction zone as a portion of the feed material.

Other continuous types of operations which may be used in this process include the compact moving bed type of operation in which the bed of catalysts and the reactants pass either concurrently or countercurrently to each other in the reaction zone, and the slurry type operation in which the catalyst is carried into the reaction zone as a slurry in one of the reactants.

The hydrocarbon conversion process of polymerization hereinbefore illustrated utilizing the catalysts of this invention is preferably effected at elevated temperatures and pressures, the temperature being in the range of from about 50° to about 300° C. or more. Generally speaking the pressure at which this process operates will be dependent upon the particular organic compound or compounds undergoing conversion and the particular catalyst which is used in the process, said pressure being sufficient to maintain a substantial portion of the hydrocarbons in the liquid phase, said pressure being in the range of from about 5 to about 250 atmospheres or more.

The following examples are given to illustrate the process of the present invention which, however, are not intended to limit the generally broad scope of the present invention in strict accordance therewith.

EXAMPLE I

In this example 50 cc. of fluoride-free calcined gamma-alumina spheres were calcined for two hours at a temperature of 550° C. The spheres were then impregnated with lithium hydroxide solution equal to 0.5 weight percent of the gamma-alumina, and then calcined for an additional two hours at 550° C. The promoted gamma-alumina was then impregnated with potassium amide in the following manner. Ammonia gas (300 cc.) was condensed in a 500 ml. flask along with 0.2 g. of calcined ferric oxide as a promoter. The flask was maintained at Dry Ice temperature (−78° C.) and potassium was slowly added to the flask in small increments accompanied by continuous stirring. When the reaction of the potassium with the condensed ammonia gas, said reaction being carried out at a temperature of about −40° C., was completed, the desired catalyst was prepared by pouring the potassium amide in the liquid ammonia solution over the promoted gamma-alumina and the flask was allowed to rotate until the ammonia evaporated. The finished catalyst contained 20% by weight of potassium amide based on the promoted gamma-alumina support. Following the evaporation of the ammonia gas the catalyst was flushed with dried nitrogen and transferred to the reactor. This catalyst was designated by the letter "A."

EXAMPLE II

Fifty cc. of precalcined fluoride-free alumina spheres were again calcined at a temperature of about 550° C. for a period of 4 to 5 hours following which the gamma-alumina was treated with sufficient lithium nitrate solution to give 0.5 weight percent of lithium based on the gamma-alumina. The promoted alumina was dried and calcined for a period of 5 to 6 hours at 550° C. during which time an evolution of nitrogen oxides occurred thereby indicating that at least a portion of the lithium was present on the alumina base in the form of lithium oxide.

A potassium amide solution was prepared by condensing 300 cc. of ammonia gas in a flask and adding the potassium thereto in small increments while the flask was maintained at the reflux temperature of the ammonia. After all of the potassium had dissolved a sufficient amount of potassium amide in the liquid ammonia solution to prepare a finished catalyst containing 20 weight percent of potassium amide based on the promoted alumina support was poured over the lithium nitrate treated gamma-alumina base and the flask was allowed to rotate until the ammonia evaporated. Upon completion of the catalyst preparation the flask was flushed with dried nitrogen and the catalyst was transferred to the reactor under a dried nitrogen flow. This catalyst was designated by the letter "B."

EXAMPLE III

Fluoride-free gamma-alumina spheres which had been precalcined at a temperature of 550° C. for a period of 4 to 5 hours were impregnated with sufficient lithium nitrate solution to give 0.5 weight percent of lithium based on the final promoted gamma-alumina. Following this the promoted alumina was dried and calcined at 550° C. for a period of 5 to 6 hours. During this time the evolution of nitrogen oxides occurred thereby indicating that at least a portion of the lithium present on the final support was in the form of lithium oxide. Potassium amide solution was prepared by dissolving potassium in small increments in liquified ammonia gas which is maintained at the reflux temperature of ammonia while adding ferric oxide as a promoter and maintaining a continuous stirring of the reactants. The potassium amide in liquid ammonia solution was poured over the promoted gamma-alumina support and the flask allowed to rotate until the ammonia evaporated. In this catalyst the potassium amide was present in an amount of about 14 weight percent based on the lithium nitrate treated gamma-alumina base. This catalyst was designated by the letter "C."

EXAMPLE IV

The catalysts which were prepared according to the above examples were then used to polymerize propylene in the following manner.

The reactor comprised a 48" long stainless steel tube of 1" inner diameter with an 18" spiral preheater. The tube contained a 5" catalyst bed which contained approximately 50 cc. of catalyst. The tube was filled with catalyst under a high surface sodium dried nitrogen flow and sealed, following which the tube was wrapped with heating tapes and insulated. The system was then pressured with nitrogen which had been dried over high surface sodium following which the charge stock comprising a mixture of propylene and n-pentane was pumped to the top of the reactor. Polymerization of the propylene was effected at a temperature ranging from about 120° to about 155° C., a pressure of about 120 atmospheres and a liquid hourly space velocity of from 1 to 2. The discharge from the reactor was passed to a back pressure regulator which reduced the pressure to atmospheric pressure into a heated distilling flask. A cold finger stabilizer separated the liquid from the unreacted gases which were condensed into a series of two traps containing Dry Ice-acetone. Any uncondensed gases which resulted from the polymerization were passed through a wet test meter. The weighed liquid product from the stabilizer was added to the Dry Ice-acetone trap and analyzed. The results of these tests are set forth in Table I below.

Table I

| Catalyst | B | A | A | C |
|---|---|---|---|---|
| Weight Percent Potassium Amide on Alumina | 20 | 20 | 20 | 14 |
| Maximum Catalyst Temp.,° C | 152 | 132 | 152 | 152 |
| Block Temp.,° C | 126 | 120 | 130 | 140 |
| n-C$_5$:C$_3$ Mole Ratio | 1:1 | 1:1 | 1:1 | 1:1 |
| LHSV | 2 | 2 | 2 | 1 |
| Pressure, Atmospheres | 120 | 120 | 120 | 120 |
| Polymerization Conversion, Percent | 75 | 28 | 45 | 82 |

It is readily apparent from the above table that the catalysts which were prepared by using an alkali salt, namely, lithium nitrate, when promoting the gamma-alumina produced a catalyst which resulted in a considerably higher conversion of propylene to the polymer thereof than did those catalysts which were prepared by using lithium hydroxide as the promoting agent for the gamma-alumina support.

We claim as our invention:

1. A method for the production of a hydrocarbon conversion catalyst which comprises treating a gamma-alumina support with an alkali metal nitrate, calcining the resultant promoted support at a temperature in the range of from about 500° to about 750° C., and thereafter impregnating said support with potassium amide to prepare the desired catalyst.

2. A method for the production of a hydrocarbon conversion catalyst which comprises treating gamma-alumina with lithium nitrate, calcining the resultant promoted alumina at a temperature in the range of from about 500° to about 750° C., and thereafter impregnating said support with potassium amide to prepare the desired catalyst.

3. A method of catalyst preparation which comprises adding an alkali metal nitrate to a substantially anhydrous alumina support having a surface area of from about 25 to about 500 square meters per gram, calcining the resultant mixture at a temperature of from about 500° to about 750° C., and thereafter compositing an alkali metal amide with the calcined support.

4. A method of catalyst preparation which comprises adding lithium nitrate to a substantially anhydrous alumina support having a surface area of from about 25 to about 500 square meters per gram, calcining the resultant mixture at a temperature of from about 500° to about 750° C., and thereafter compositing an alkali metal amide with the calcined support.

5. A method of catalyst preparation which comprises adding lithium nitrate to a substantially anhydrous alumina support having a surface area of from about 25 to about 500 square meters per gram, calcining the resultant mixture at a temperature of from about 500° to about 750° C., and thereafter compositing potassium amide with the calcined support.

References Cited in the file of this patent

UNITED STATES PATENTS

| | | |
|---|---|---|
| 1,159,364 | De Jahn | Nov. 9, 1915 |
| 2,398,810 | Soday | Apr. 23, 1946 |
| 2,413,256 | Soday | Dec. 24, 1946 |
| 2,881,234 | Esmay et al. | Apr. 7, 1959 |